(12) United States Patent
Ketola et al.

(10) Patent No.: US 9,372,570 B2
(45) Date of Patent: Jun. 21, 2016

(54) USER INTERFACE

(71) Applicant: Nokia Technologies Oy, Espoo (FI)

(72) Inventors: Pekka Ketola, Tampere (FI); Jari Selenius, Nurmijarvi (FI); Panu Johansson, Pyynikintori (FI); Ari Tolonen, Honkola (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/299,225

(22) Filed: Jun. 9, 2014

(65) Prior Publication Data

US 2014/0347300 A1    Nov. 27, 2014

Related U.S. Application Data

(63) Continuation of application No. 12/790,197, filed on May 28, 2010, now Pat. No. 8,780,059.

(51) Int. Cl.
*G06F 3/041* (2006.01)
*G06F 3/0488* (2013.01)

(52) U.S. Cl.
CPC ............ *G06F 3/0412* (2013.01); *G06F 3/0488* (2013.01); *G06F 2203/04108* (2013.01)

(58) Field of Classification Search
CPC .............................. G06F 17/24; G06F 17/3089
See application file for complete search history.

(56) References Cited

U.S. PATENT DOCUMENTS

| 6,243,054 | B1 | 6/2001 | DeLuca |
| 6,559,813 | B1 | 5/2003 | DeLuca |
| 2003/0076364 | A1 | 4/2003 | Martinez et al. |
| 2006/0070007 | A1 | 3/2006 | Cummins et al. |
| 2006/0161871 | A1 | 7/2006 | Hotelling et al. |
| 2006/0267966 | A1 | 11/2006 | Grossman et al. |
| 2008/0309621 | A1* | 12/2008 | Aggarwal et al. ............. 345/173 |
| 2009/0007012 | A1 | 1/2009 | Mandic et al. |
| 2009/0122007 | A1 | 5/2009 | Tsuzaki et al. |
| 2009/0289914 | A1 | 11/2009 | Cho |
| 2009/0303199 | A1 | 12/2009 | Cho et al. |
| 2010/0095206 | A1 | 4/2010 | Kim |

FOREIGN PATENT DOCUMENTS

| CN | 101430624 A | 5/2009 |
| EP | 0 851 349 A2 | 7/1998 |
| EP | 2 124 138 A2 | 11/2009 |
| EP | 2 128 823 A1 | 12/2009 |

(Continued)

OTHER PUBLICATIONS

Office Action for Chinese Application No. 201180036812.6 dated Dec. 26, 2014.
Office Action for U.S. Appl. No. 12/790,197 dated Aug. 3, 2012.

(Continued)

*Primary Examiner* — Kenneth B Lee, Jr.
(74) *Attorney, Agent, or Firm* — Alston & Bird LLP (57) ABSTRACT

An apparatus, method and computer program are provided. The method comprises: controlling a touch sensitive display, while a user digit is detected hovering a distance from the touch sensitive display, to display a transient indication of first content for pasting, wherein if the user subsequently moves the user digit away from the touch sensitive display such that the user digit is no longer detected, the transient indication of the first content for pasting is removed from display on the touch sensitive display.

18 Claims, 6 Drawing Sheets

(56) References Cited

FOREIGN PATENT DOCUMENTS

| EP | 2 138 929 A2 | 12/2009 |
|---|---|---|
| TW | 200933433 A | 8/2009 |

OTHER PUBLICATIONS

Office Action for U.S. Appl. No. 12/790,197 dated Jan. 24, 2013.
Office Action for U.S. Appl. No. 12/790,197 dated Aug. 1, 2013.
Notice of Allowance for U.S. Appl. No. 12/790,197 dated Feb. 28, 2014.
International Search Report and Written Opinion from International Patent Application No. PCT/IB2011/052046, filed May 10, 2011.
"Cypress Touchscreens Track Hovering Fingers, Make Devices Even More 'Magical' (Video)" [online] [retrieved Jan. 28, 2011]. Retrieved from the Internet: <http://www.engadget.com/2010/04/23/cypress-touchscreens-track-hovering-fingers-make-devices-even-m>. Apr. 23, 2010, 4 pages.
"Using Touch Gestures" [online] [retrieved Jan. 28, 2011]. Retrieved from the Internet: <http://windows.microsoft.com/en-us/windows7/using-touch-gestures>. 2 pages.
Office Action from corresponding Taiwanese Patent Application No. 100118646, dated Jul. 29, 2015.
Extended European Search Report for EP 11786213.6, dated Mar. 14, 2016.

\* cited by examiner

USER INTERFACE

CROSS REFERENCE TO RELATED APPLICATIONS

This application is a continuation of and claims priority to U.S. application Ser. No. 12/790,197, which was filed May 28, 2010, which is hereby incorporated by reference in its entirety.

TECHNOLOGICAL FIELD

Embodiments of the present invention relate to a user interface. In particular, they relate to using a user interface to perform a pasting operation.

BACKGROUND

Copy, cut and paste are common operations provided by a computing device. They are used to transfer content from a source to a destination.

Copying typically involves copying content to a clipboard (which may or may not be visible to the user). Cutting typically involves copying content to a clipboard and deleting the content being copied from its current location. Pasting typically involves inserting the content stored in the clipboard into a new location.

Many hand portable electronic devices, such as mobile telephones, comprise a touch sensitive display. While some hand portable electronic devices allow a user to perform cut, copy and paste operations, typically these operations are cumbersome to perform using a touch sensitive display.

BRIEF SUMMARY

According to various, but not necessarily all, embodiments of the invention there is provided a method, comprising: controlling a touch sensitive display, while a user digit is detected hovering a distance from the touch sensitive display, to display a transient indication of first content for pasting, wherein if the user subsequently moves the user digit away from the touch sensitive display such that the user digit is no longer detected, the transient indication of the first content for pasting is removed from display on the touch sensitive display.

According to various, but not necessarily all, embodiments of the invention there is provided an apparatus, comprising: at least one processor; and at least one memory storing computer program instructions, the at least one processor being configured to execute the computer program instructions to cause the apparatus at least to perform: controlling a touch sensitive display, while a user digit is detected hovering a distance from the touch sensitive display, to display a transient indication of first content for pasting, wherein if the user subsequently moves the user digit away from the touch sensitive display such that the user digit is no longer detected, the transient indication of the first content for pasting is removed from display on the touch sensitive display.

According to various, but not necessarily all, embodiments of the invention there is provided a non-transitory computer readable medium storing a computer program comprising computer program instructions that, when executed by at least one processor, cause an apparatus at least to perform: controlling a touch sensitive display, while a user digit is detected hovering a distance from the touch sensitive display, to display a transient indication of first content for pasting, wherein if the user subsequently moves the user digit away from the touch sensitive display such that the user digit is no longer detected, the transient indication of the first content for pasting is removed from display on the touch sensitive display.

According to various, but not necessarily all, embodiments of the invention there is provided an apparatus, comprising: means for controlling a touch sensitive display, while a user digit is detected hovering a distance from the touch sensitive display, to display a transient indication of first content for pasting, wherein if the user subsequently moves the user digit away from the touch sensitive display such that the user digit is no longer detected, the transient indication of the first content for pasting is removed from display on the touch sensitive display.

According to various, but not necessarily all, embodiments of the invention there is provided a method, comprising: selecting first content for pasting; responding to detection of a user digit, hovering a distance from the touch sensitive display, by controlling a touch sensitive display to display a transient indication of the first content selected for pasting; and responding to user touch input at the touch sensitive display, by initiating a paste operation to paste the first content.

Selecting the first content for pasting may involve performing a copy operation. Alternatively, selecting the first content for pasting may involve performing a cut operation.

According to various, but not necessarily all, embodiments of the invention there is provided an apparatus, comprising: at least one processor; and at least one memory storing computer program instructions, the at least one processor being configured to execute the computer program instructions to cause the apparatus at least to perform: selecting first content for pasting; responding to detection of a user digit, hovering a distance from the touch sensitive display, by controlling a touch sensitive display to display a transient indication of the first content selected for pasting; and responding to user touch input at the touch sensitive display, by initiating a paste operation to paste the first content.

According to various, but not necessarily all, embodiments of the invention there is provided a non-transitory computer readable medium storing a computer program comprising computer program instructions that, when executed by at least one processor, cause an apparatus at least to perform: selecting first content for pasting; responding to detection of a user digit, hovering a distance from the touch sensitive display, by controlling a touch sensitive display to display a transient indication of the first content selected for pasting; and responding to user touch input at the touch sensitive display, by initiating a paste operation to paste the first content.

According to various, but not necessarily all, embodiments of the invention there is provided an apparatus, comprising: means for selecting first content for pasting; means for responding to detection of a user digit, hovering a distance from the touch sensitive display, by controlling a touch sensitive display to display a transient indication of the first content selected for pasting; and means for responding to user touch input at the touch sensitive display, by initiating a paste operation to paste the first content.

BRIEF DESCRIPTION

For a better understanding of various examples of embodiments of the present invention reference will now be made by way of example only to the accompanying drawings in which.

DETAILED DESCRIPTION

Embodiments of the invention relate to a method of performing a paste operation. In embodiments of the invention, a user's digit is used as "virtual storage" for information during the paste operation. When a user hovers a digit a distance from a touch sensitive display, the touch sensitive display displays a preview of what will be pasted if the user provides touch input at the touch sensitive display with the digit.

The Figures illustrate a method, comprising: controlling a touch sensitive display 22, while a user digit 70 is detected hovering a distance from the touch sensitive display 22, to display a transient indication 80 of first content 160 for pasting, wherein if the user subsequently moves the user digit 70 away from the touch sensitive display 22 such that the user digit 70 is no longer detected, the transient indication 80 of the first content 160 for pasting is removed from display on the touch sensitive display 22; and in response to detection of touch input from the user digit 70 at the touch sensitive display 22, initiating a paste operation using the first content 160, wherein the paste operation comprises controlling the touch sensitive display 22 to display a representation 60 of the first content, and continuing to display the representation 60 of the first content after the user digit 70 has been removed from the touch sensitive display 22.

Figure 1:
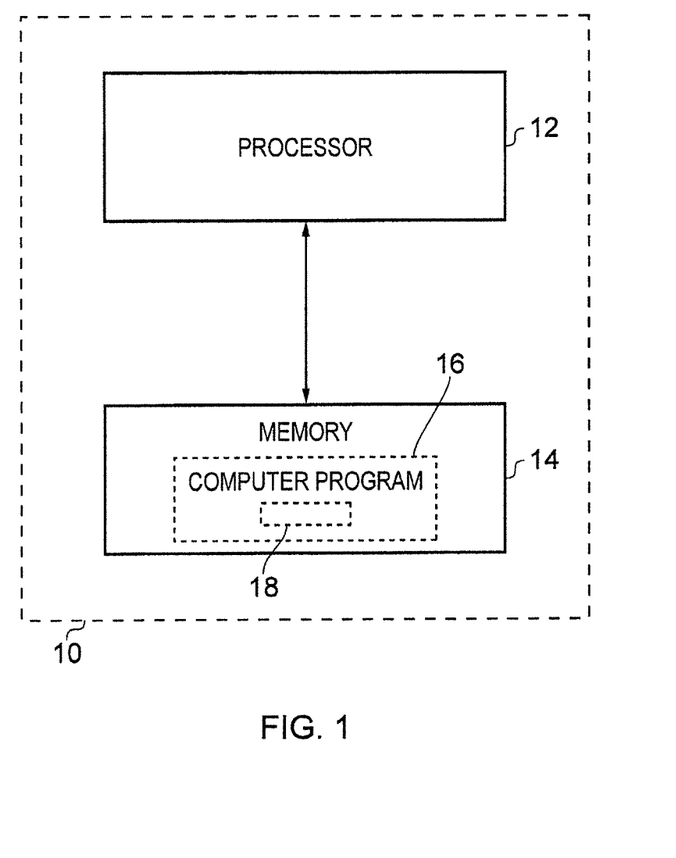
FIG. 1 illustrates an apparatus.

FIG. 1 illustrates an apparatus 10. The apparatus may, for example, be a chip or a chip-set. The apparatus 10 illustrated in FIG. 1 comprises a processor 12 and a memory 14. In alternative embodiments of the invention, the apparatus 10 may comprise multiple processors.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component it may be implemented as one or more separate components, some or all of which may be integrated/removable and/or may provide permanent/semi-permanent/dynamic/cached storage.

Figure 2:
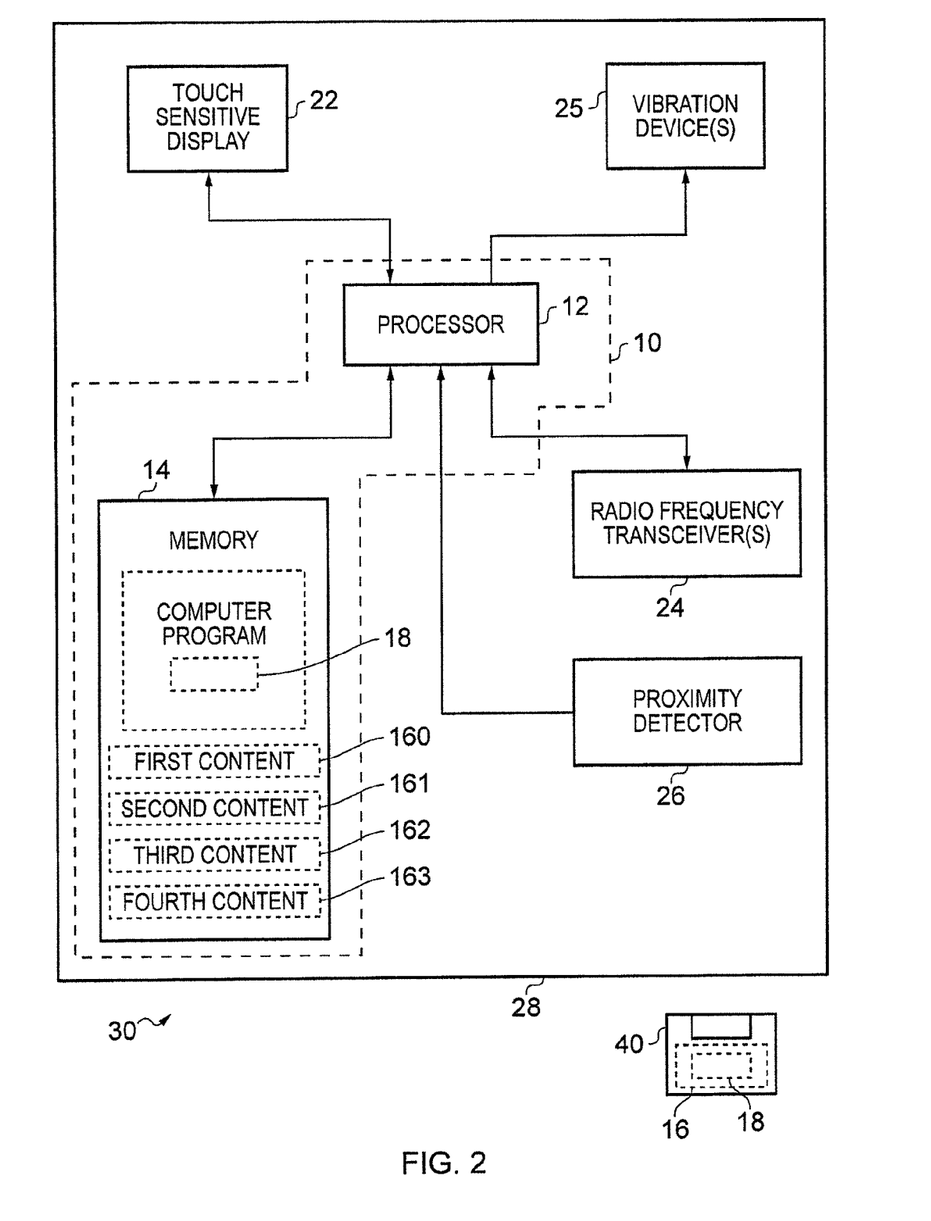
FIG. 2 illustrates a further apparatus.

In FIG. 2, the memory 14 is illustrated as storing first, second, third and fourth content 160-163. Each of first, second, third and fourth content 160-163 may, for example, be textual content, audio content, visual content or audiovisual content.

The memory 14 stores a computer program 16 comprising computer program instructions 18 that control the operation of the apparatus 10/30 when loaded into the processor 12. The computer program instructions 18 provide the logic and routines that enables the apparatus 10/30 to perform the method illustrated in FIG. 3. The processor 12 by reading the memory 14 is able to load and execute the computer program instructions 18.

The computer program 16 may arrive at the apparatus 10/30 via any suitable delivery mechanism 40. The delivery mechanism 40 may be, for example, a tangible (non-transitory) computer-readable storage medium, a computer program product, a memory device, a record medium such as a CD-ROM, DVD or Blu-Ray disc, or any article of manufacture that tangibly embodies the computer program 16. The delivery mechanism 40 may be a signal configured to reliably transfer the computer program 16.

FIG. 2 illustrates a further apparatus 30. The apparatus 30 illustrated in FIG. 2 may, for example, be a hand portable electronic device such as a mobile telephone, a personal music player, a personal digital assistant, a computer, a games console, a tablet computer or a camera.

The apparatus 30 illustrated in FIG. 2 comprises the apparatus 10 illustrated in FIG. 1. The apparatus 30 further comprises a housing 28, a touch sensitive display 22, a proximity detector 26, and optionally, at least one radio frequency transceiver 24 and at least one vibration device 25. The housing 28 houses: the processor 12, the memory 14, the touch sensitive display 22, the radio frequency transceiver(s) 24, the vibration device(s) 25 and the proximity detector 26. The elements 12, 14, 22, 24, 25 and 26 are co-located within the housing 28. The elements 12, 14, 22, 24, 25 and 26 are operationally coupled and any number or combination of intervening elements can exist (including no intervening elements).

The processor 12 is configured to provide outputs to the touch sensitive display 22, the radio frequency transceiver(s) 24 and the vibration device(s) 25. The processor 12 is configured to receive inputs from the radio frequency transceiver(s) 24, the proximity detector 26 and the touch sensitive display 22.

The touch sensitive display 22 is configured to provide a graphical user interface. The touch sensitive display 22 may be any type of touch sensitive display, such as a resistive touch sensitive display or a capacitive touch sensitive display.

In some embodiments of the invention, the touch sensitive display 22 is a stereoscopic display for displaying three-dimensional images. The display 22 may, for example, be autostereoscopic such that three-dimensional images displayed on the display 22 can be viewed by a user without the use of glasses.

The one or more radio frequency transceivers 24 are configured to transmit and receive radio frequency signals. The radio frequency transceiver(s) 24 may, for example, include one or more cellular transceivers that are compatible with one or more cellular protocols such as GSM (Global System for Mobile Communications), IS-95 (Interim Standard 95) or UMTS (Universal Mobile Telecommunications System). Alternatively or additionally, the radio frequency transceiver(s) 24 may include a short range radio transceiver that is compatible with one or more short range protocols, such as Bluetooth protocols or IEEE (Institute of Electrical and Electronic Engineers) protocols.

The vibration device(s) 25 may be configured to provide a user with haptic/vibration feedback when the user provides touch input at the touch sensitive display 22.

The proximity detector 26 is configured to detect at least one user digit when the user digit(s) is/are hovering a distance from the touch sensitive display 22. The proximity detector 26 may also be configured to detect the position of one or more user digits. For example, the proximity detector 26 may be configured to detect the position of one or more user digits in two dimensions, where each of those dimensions is parallel to a plane defined by a surface of the touch sensitive display 22. The proximity detector 26 may also be configured to detect the position of the user digit(s) in a third dimension, where the third dimension is perpendicular to the plane defined by the surface of the touch sensitive display 22. In some example embodiments of the invention, the proximity detector 26 may be configured to detect the orientation of the user digit(s).

The proximity detector 26 may use one or more of a number of sensing technologies, including capacitive, optical (infra-red or visual light), acoustic emission, radar or sonar technologies.

The proximity detector 26 may, for example, be configured to generate a detection field in front of the touch sensitive display 22. The type of field generated depends upon the technology that is used in the proximity detector 26. The proximity detector 26 may detect one or more user digits hovering a distance from the touch sensitive display 26 by monitoring the field for disturbances in the field that are characteristic of user digit(s) being present.

The proximity detector 26 may comprise circuitry that is partially or completely shared with that of the touch sensitive display 22. For example, in some embodiments of the invention, the touch sensitive display 22 and the proximity detector 26 may operate using shared capacitive circuitry.

A method according to embodiments of the invention will now be described in conjunction with FIGS. 3 to 9.

Figure 4:
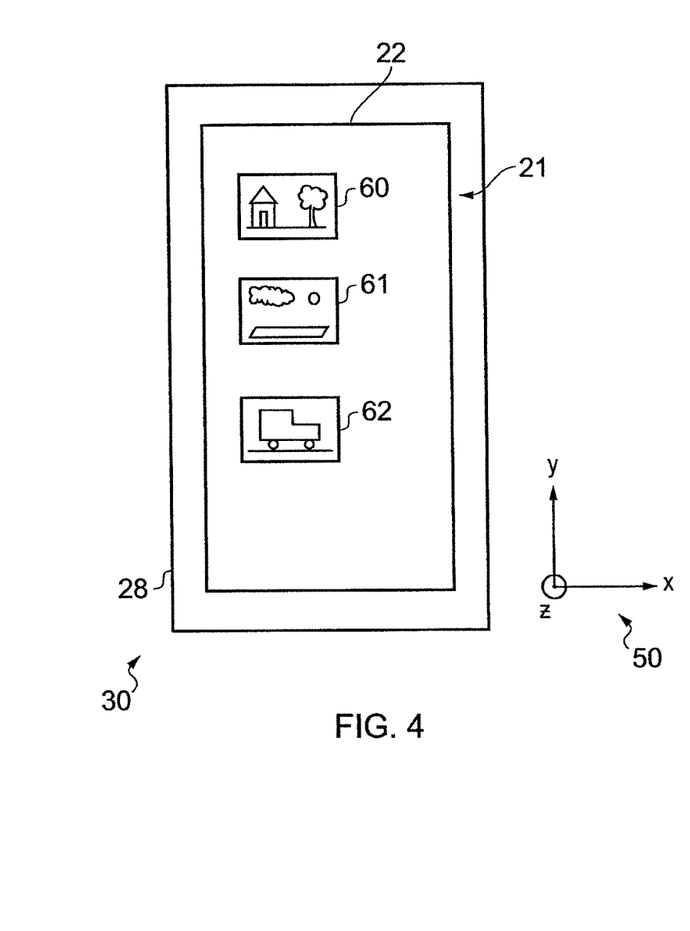
FIG. 4 illustrates an apparatus displaying representations of first, second and third content.

FIG. 4 illustrates a front face 21 of the apparatus 30 illustrated schematically in FIG. 2. The front face 21 of the apparatus 30 comprises the touch sensitive display 22. In FIG. 4, the touch sensitive display 22 is illustrated as displaying first 60, second 61 and third 62 representations of the first 160, second 161 and third 162 content (respectively) stored in the memory 14.

In this example, each of the first, second and third content 160-162 is an image. The first, second and third representations 60-62 are thumbnails of the first, second and third content 160-162. Each of the thumbnails is scaled down version of the image that it represents.

In this particular example of the invention, the first, second and third representations are graphical in nature. In other examples of the invention, the first, second and third representations may or may not be graphical. For example, the first, second and third representations may comprise (or solely consist of) text.

FIG. 4 illustrates co-ordinate axes 50. In FIG. 4, the x and y axes are perpendicular to one another and parallel to the plane of the page. The z axis is perpendicular to the x and y axes and perpendicular to the plane of the page. Co-ordinate axes 50 are also illustrated in FIGS. 5 to 9 to indicate the orientation of the apparatus 30 in those figures. The depth of the apparatus 30 is in the z-direction. The width of the apparatus 30 (and the touch sensitive display 22) is in the x-direction. The length of the apparatus (and the touch sensitive display 22) is in the y-direction.

In example embodiment of the invention illustrated in FIG. 4, the touch sensitive display 22 has a substantially flat outer surface on the front face 21 of the apparatus 30. The substantially flat outer surface of the touch sensitive display 22 can be considered to be in a plane defined by the x and y axes illustrated in FIG. 4.

A user may cause content to be selected for pasting by providing some form of predetermined touch input at the representation for that content. For example, in some implementations of the invention, the user may select the first content 160 for pasting by touching the outer surface of the touch sensitive display 22, at the first representation 60, for at least a threshold period of time. In other implementations of the invention, the user may select the first content 160 for pasting by tracing a predetermined symbol on the outer surface of the touch sensitive display 22 at the first representation 60 (such as a "Z" or an "O", for instance).

Figure 5:
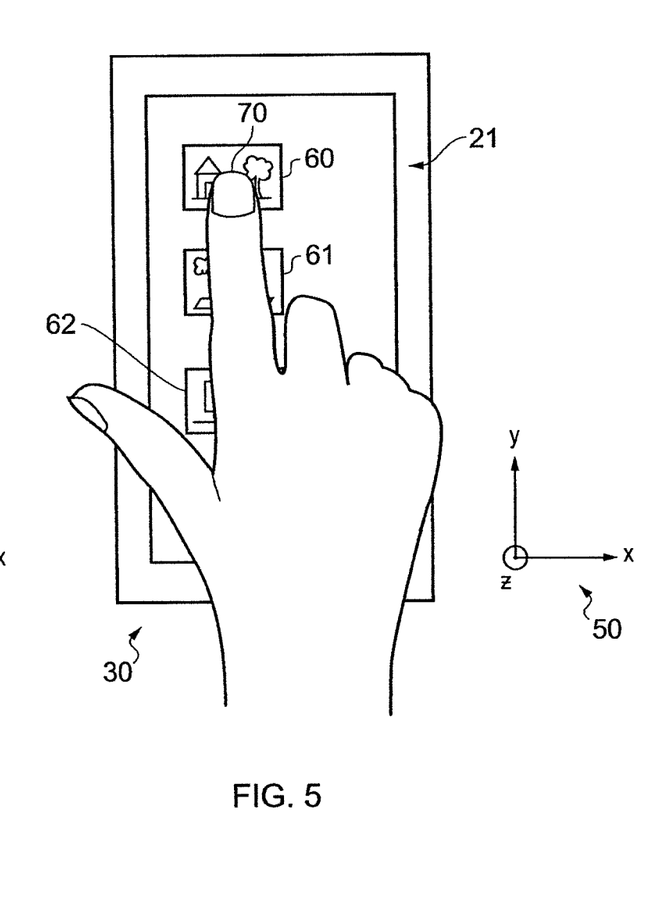
FIG. 5 illustrates a user selecting first content for pasting.

FIG. 5 illustrates a user providing predetermined touch input at the first representation 60 using a digit 70. In response to detection of the predetermined touch input, the processor 12 selects the first content 160 for pasting. In some example implementations of the invention, the processor 12 may select the first content 160 for pasting by performing a copy operation. In other example implementations, the processor 12 may select the first content for pasting by performing a cut operation. When a copy or cut operation is performed, the processor 12 may store the first content 160 in a temporary memory location. If a copy operation is performed, the first content 160 is not deleted from its current location in the memory 14. If a cut operation is performed, the first content 160 is deleted from its current location.

In some instances, whether a cut or a copy operation is performed may depend upon the type of user input that is provided at the first representation 60. For example, a first type of user input may be provided to cause a cut operation to be performed by the processor 12, and a second type of user input may be provided to cause a copy operation to be performed by the processor 12.

The processor 12 may control one or more of the vibration devices 25 to provide vibration feedback to the user's digit 70 when the first content 160 is selected for pasting. Once the first content 160 has been selected for pasting, the processor 12 may alter the appearance of the first representation 60 to indicate to the user that the first content 160 has been selected for pasting. For example, the processor 12 may control the touch sensitive display 22 to graphically depict the first representation 60 emanating outwardly from the surface of the touch sensitive display 22 and into the user's digit 70 (for example, using a stereoscopic display or a non-stereoscopic display). The user perceives from this that the first content 160 is being stored, in a virtual sense, in the digit 70 placed at the touch sensitive display 22.

Figure 6:
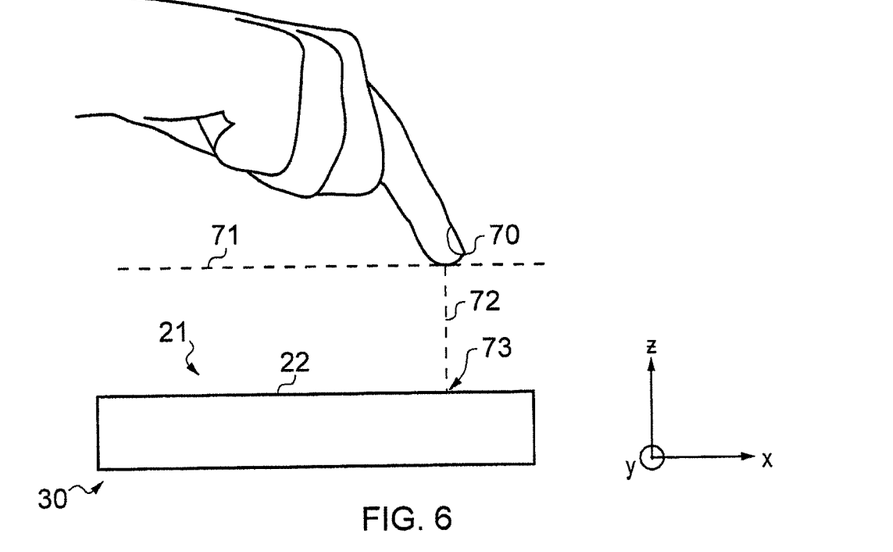
FIG. 6 illustrates a user hovering a digit a distance from a touch sensitive display.

The user then moves his digit 70 away from the surface of the display 22. The user may subsequently navigate through a menu system, for example by providing touch input at the touch sensitive display 22 using the digit 70, to find an appropriate location to paste the first content 160. When an appropriate location is found, the user causes his digit to hover a distance away from the display 22. FIG. 6 illustrates the user digit 70 hovering above the display 22.

The proximity detector 26 detects the hovering digit as a "hovering input". When the proximity detector 26 detects a "hovering input", a different input signal is provided to the processor 12 as compared to when a "touch input" is registered at the touch sensitive display 22. The distance from the surface of the display 22 at which a hovering input is detected depends upon the sensitivity of the proximity detector 26.

When the user's digit 70 is hovering, it is not close enough to the touch sensitive display 22 for touch input to be registered by the display 22. A hovering digit does not touch the outer surface of the touch sensitive display 22.

Some touch sensitive displays (for example, those incorporating capacitive technology) are sensitive enough to register a touch input when a user's digit is very close to the display but not quite touching the display. If such a display is used in embodiments of the invention, a "touch input" is registered when the digit is very close to the display, and a "hovering input" is detected when the digit is a greater distance from the display.

In this example embodiment of the invention, the proximity detector 26 is configured to determine the position of the user's digit in at least one plane 71 overlying and parallel with the surface of the touch sensitive display 22. It will be appreciated by those skilled in the art that the proximity detector 26 may be configured to detect a user digit at multiple different distances from the display 22 (and therefore in multiple different planes).

In the example illustrated in FIG. 6, the dotted line 72 indicates the position of the user's digit in the plane 71. The arrow marked with the reference numeral 73 indicates a point on the display 22 that corresponds (and in this example, is directly beneath) the position of the user's digit 70 in the plane 71.

Figure 3:
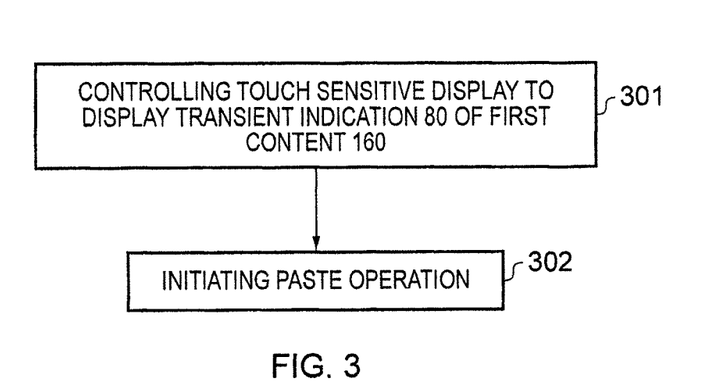
FIG. 3 illustrates a flow chart of a method.
Figure 7:
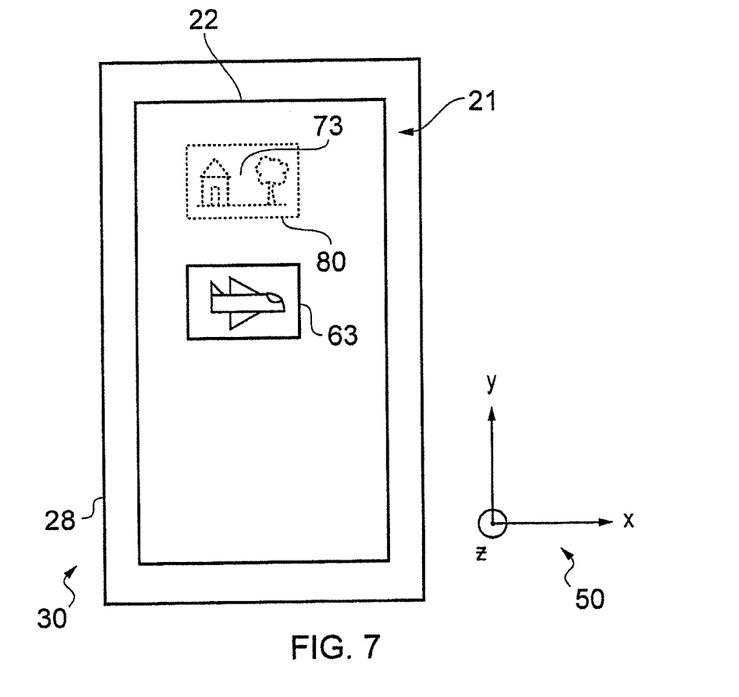
FIG. 7 illustrates the touch sensitive display while the user is hovering the digit.

In block 301 of the method illustrated in FIG. 3, when the user's digit 70 is detected hovering a distance from the touch sensitive display 22 by the proximity detector 26, the processor 12 controls the display 22 to display a transient indication 80 of the first content 160 for pasting. This is illustrated in FIG. 7. In some implementations of the invention, the processor 12 does not control the display 22 to display the transient indication 80 until a hovering user digit has been detected for at least a threshold period of time.

Advantageously, the transient indication 80 provides an indication (a preview) of the content that will be pasted if a pasting operation is subsequently initiated. In this example, the transient indication 80 depicts the thumbnail 60 representing the first content 160. This provides the user with the impression that the first content is stored, in a virtual sense, in his digit 70. It may also help a user to determine whether to perform the pasting operation and/or to determine where to perform the pasting operation.

In some embodiments of the invention, the processor 12 is configured to display the transient indication 80 when the user's digit 70 is within a certain range of the touch sensitive display 22 and aligned with the touch sensitive display 22. For instance, in the context of the illustrated example, the transient indication 80 may be displayed when the user's digit is spaced from (and within a certain range of) the touch sensitive display 22 in the z-direction and aligned with (that is, not spaced from) the touch sensitive display 22 in the x and y directions.

In this example, processor 12 controls the position at which the transient indication 80 is displayed in dependence upon the position of the user's digit 70. If the user moves the digit 70 across the display 22 (and without touching the display 22), the processor 12 controls the display 22 to display the transient indication 80 moving across the display 22 in real time with the digit 70.

If the user subsequently moves the digit 70 away from the touch sensitive display 22 such that it is no longer detected (or no longer aligned with the touch sensitive display 22 in the x and y dimensions), the transient indication 80 of the first content is removed from display on the touch sensitive display 22.

In the event that the user brings the digit 70 back towards the touch sensitive display 22, such that the proximity detector 26 again detects that the digit 70 is aligned with the touch sensitive display 22 in the x and y dimensions, the processor 12 restores the transient indication 80 to the display 22 at a position on the display 22 that corresponds with the position of the digit 70.

In one example, the transient indication 80 of the first content 160 is not selectable by a user. The transient indication 80 may be displayed on the display 22 concurrently with one or more graphical items that are selectable by the user. For example, FIG. 7 illustrates a fourth representation 63 of fourth content 163 being displayed on the display 22 concurrently with the transient indication 80 of the first content 160. In some implementations of the invention, the fourth representation 63 is selectable by the user.

Figure 8:
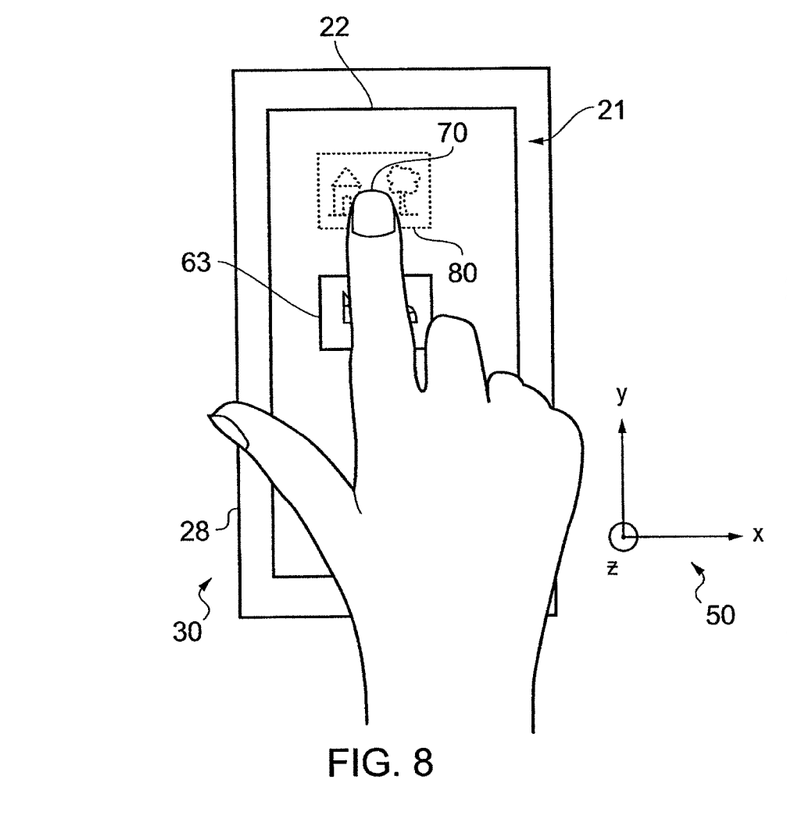
FIG. 8 illustrates a user initiating a paste operation.

FIG. 8 illustrates the user touching the surface of the touch sensitive display 22, using the digit 70, to initiate a paste operation. At block 302 of FIG. 3, the processor 12 detects the touch input and initiates a paste operation using the first content 160.

The paste operation may, for example, be initiated in response to some form of predetermined touch input being provided at the touch sensitive display 22. For example, the user may initiate the paste operation by touching the outer surface of the touch sensitive display 22 for at least a threshold period of time. In other implementations of the invention, the user may initiate the paste operation by tracing a predetermined symbol on the outer surface of the touch sensitive display 22 (such as a "Z" or an "O", for instance).

The processor 12 may control the vibration device(s) 25 to provide vibration feedback to the user's digit 70 when the paste operation is initiated.

The paste operation comprises storing the first content 160 to a particular (non-temporary) location in the memory 14. The paste operation also comprises controlling the touch sensitive display 22 to display a representation 60 of the first content 160. When the first content 160 is stored at the user's desired location, the processor 12 controls the display 22 to display the representation 60 of the first content 160. In the example given in the figures, the representation 60 that is displayed 22 when the paste operation 60 is performed is the same as the representation 60 that was displayed prior to the first content 160 being selected for pasting.

Figure 9:
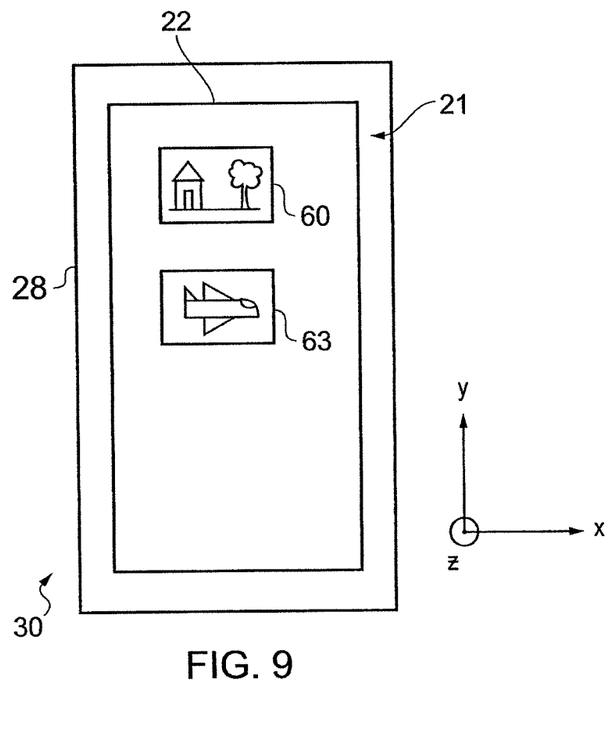
FIG. 9 illustrates an apparatus after a paste operation has been performed.

FIG. 9 illustrates the representation 60 of the first content 60 being displayed alongside the representation 63 of the fourth content 60 after the pasting operation has been performed. The representation 60 of the first content 160 that is displayed after the paste operation is not 'transient' like the indication 80 displayed prior to the pasting operation. In this regard, the processor 12 controls the display 22 to continue displaying the representation 60 after the user digit 70 has been removed from the vicinity of the display 22, irrespective of whether the user digit 70 is in a position in which it may be detected by the proximity detector 26. The representation 80 may, for example, be user selectable and/or user editable.

References to 'a tangible computer-readable storage medium', 'a computer program product', a 'computer', and a 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile telephone or a similar integrated circuit in server, a cellular network device, or other network device.

The blocks illustrated in FIG. 3 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, embodiments of the invention are described above in the context of an example involving pasting content in the form of a still image. However, embodiments of the invention are not limited to this example. In other embodiments of the invention, the content may, for instance, include textual content, video content or audio content.

For example, embodiments of the invention may be used to edit an image. In these embodiments of the invention, the transient indication 80 might provide an indication of how the image will appear after the editing step (the pasting) has occurred.

In some implementations of the invention, the proximity detector 26 is configured to detect the positions of at least two hovering digits. In these implementations, the processor 12 may be configured to display two transient indications simultaneously. The processor 12 may, for example, control the display 22 such that each transient indication moves across the display 22 in real time with its related user digit.

The paragraphs above describe the paste operation being initiated by the user touching the outer surface of the touch sensitive display 22. In other, alternate embodiments of the invention, the paste operation may be initiated by pressing a mechanical key, separate to the display 22.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
   selecting, by at least one processor, content for pasting;
   controlling a display, while a hovering input is provided by a user a distance from a proximity detector, to transiently display the content on the display prior to a paste operation being performed, wherein the transient display of the content is moveably displayed at a position that corresponds with a position of the hovering input; and
   in response to a touch input being detected, initiating a paste operation using the content, wherein the paste operation comprises controlling the display to display the content non-transiently.

2. The method as claimed in claim 1, wherein the proximity detector detects the position of the hovering input in at least one of a first dimension and a second dimension, while the hovering input is provided a distance from the proximity detector in a third dimension.

3. The method as claimed in claim 2, wherein the transient display of the content is moveably displayed at a position on the display that corresponds with the position of the hovering input in the least one of the first and second dimensions.

4. The method as claimed in claim 1, wherein an outer surface of an apparatus is substantially aligned with an x-axis and a y-axis and the transient display of the content is moveably displayed at a position that corresponds with a position of the hovering input, detected by a proximity detector, in an x-y plane above the outer surface.

5. The method as claimed in claim 4, wherein
   the touch input is detected at the outer surface.

6. The method as claimed in claim 1, wherein the display is a touch sensitive display, and the touch input is provided at the touch sensitive display.

7. The method as claimed in claim 1, further comprising:
   controlling the display to remove the transient display of the content from display when the user ceases to provide the hovering input; and
   restoring the transient display of the content to the display when the user recommences the hovering input.

8. Apparatus, comprising at least one processor and at least one memory storing computer program instructions configured, working with the at least one processor, to cause the apparatus at least to perform:
   selecting, by the at least one processor, content for pasting;
   controlling a display, while a hovering input is provided by a user a distance from a proximity detector, to transiently display the content on the display prior to a paste operation being performed, wherein the transient display of the content is moveably displayed at a position that corresponds with a position of the hovering input; and
   in response to a touch input being detected, initiating a paste operation using the content, wherein the paste operation comprises controlling the display to display the content non-transiently.

9. The apparatus as claimed in claim 8, wherein the proximity detector detects the position of the hovering input in at least one of a first dimension and a second dimension, while the hovering input is provided a distance from the proximity detector in a third dimension.

10. The apparatus as claimed in claim 9, wherein the transient display of the content is moveably displayed at a position on the display that corresponds with the position of the hovering input in the at least one of the first and second dimensions.

11. The apparatus as claimed in claim 8, wherein an outer surface of the apparatus is substantially aligned with an x-axis and a y-axis, and the transient display of the content is moveably displayed at a position that corresponds with a position of the hovering input, detected by a proximity detector, in an x-y plane above the outer surface.

12. The apparatus as claimed in claim 11, wherein the touch input is detected at the outer surface.

13. The apparatus as claimed in claim 8, wherein the display is a touch sensitive display, and the touch input is provided at the touch sensitive display.

14. The apparatus as claimed in claim 8, wherein the computer program instructions are further configured, working with the at least one processor, to cause the apparatus at least to perform:

refraining from controlling the display to display the transient display of the content until a hovering input has been detected for at least a threshold period of time.

15. The apparatus as claimed in claim 8, further comprising the proximity detector.

16. A non-transitory computer readable medium storing a computer program comprising computer program instructions configured, working with at least one processor, to cause an apparatus at least to perform:

selecting, by the at least one processor, content for pasting;

controlling a display, while a hovering input is provided by a user a distance from a proximity detector, to transiently display the content on the display prior to a paste operation being performed, wherein the transient display of the content is moveably displayed at a position that corresponds with a position of the hovering input; and in response to a touch input being detected, initiating a paste operation using the content, wherein the paste operation comprises controlling the display to display the content non-transiently.

17. The method as claim in claim 1, wherein selecting the content for pasting comprises performing a copy operation or a cut operation.

18. The apparatus as claimed in claim 8, wherein selecting the content for pasting comprises performing a copy operation or a cut operation.

* * * * *